United States Patent [19]

Auburn et al.

[11] 3,998,657
[45] Dec. 21, 1976

[54] ELECTROCHEMICAL CELLS

[75] Inventors: James J. Auborn, Groton, Mass.;
Richard D. Bezman, White Plains, N.Y.

[73] Assignee: GTE Laboratories Incorporated, Waltham, Mass.

[22] Filed: July 25, 1975

[21] Appl. No.: 599,273

[52] U.S. Cl. .............................. 429/196; 429/218
[51] Int. Cl.$^2$ ....................................... H01M 43/06
[58] Field of Search ............... 136/6 LN, 20, 83 R, 136/100 R, 137, 155, 121, 122

[56] References Cited

UNITED STATES PATENTS

| | | | |
|---|---|---|---|
| 3,891,457 | 6/1975 | Auborn | 136/6 LN |
| 3,907,597 | 9/1975 | Mellors | 136/100 R |
| 3,923,543 | 12/1975 | Auborn et al. | 136/6 LN |
| 3,926,669 | 12/1975 | Auborn | 136/6 LN |

*Primary Examiner*—Anthony Skapars
*Attorney, Agent, or Firm*—Irving M. Kriegsman

[57] ABSTRACT

Electrochemical cells having an oxidizable anode material, such as lithium, a cathode material, such as carbon or $(C_4F)_n$, upon the surface of which the solvent material is electrochemically reduced during operation of the cell, and an electrolytic solution comprising an inorganic solvent and a solute dissolved therein. The electrolytic solution further contains an additive such as sulfur monochloride ($S_2Cl_2$), which is capable of dissolving any sulfur generated during operation of the cell and which is unreactive with the other components of the cell.

24 Claims, No Drawings

ELECTROCHEMICAL CELLS

FIELD OF THE INVENTION

This invention relates to electrochemical cells. More particularly, this invention relates to electrochemical cells having an electrolytic solution which contains an additive which prevents the deposition of elemental sulfur during operation of the cells.

In copending application Ser. No. 492,316, filed July 26, 1974, now abandoned, there is described electrochemical cells having an oxidizable active anode material, such as lithium, a carbon cathode, and an electrolytic solution between and in contact with the anode and cathode, the electrolytic solution comprising a covalent inorganic oxyhalide solvent, such as thionyl chloride, sulfuryl chloride, or mixtures thereof, and a solute dissolved therein. It has been found that the carbon cathode material catalyzes the electrochemical decomposition of the solvent during discharge of the cell, thereby enabling the otherwise "dead" weight of the solvent to be utilized as a source of energy.

In copending application Ser. No. 517,557, filed Oct. 24, 1974, now U.S. Pat. No. 3,923,543, there is described electrochemical cells having an oxidizable active anode material, such as lithium, a cathode including, as the active cathode material, an intercalation compound of carbon and fluorine of the general formula $(C_4F)_n$, and an electrolytic solution between and in contact with the anode and cathode, the electrolytic solution comprising a covalent inorganic oxyhalide solvent selected from those set forth above, and a solute dissolved therein. It has been found that the above-identified intercalation compound catalyzes the electrochemical decomposition of the solvent resulting, unexpectedly, in a cell having a coulombic cathode utilization efficiency greater than 100% of the theoretical attainable according to reduction of the active cathode material. Once again, the otherwise "dead" weight of the electrolytic solvent can be utilized as a source of energy.

During testing of lithium anode cells with spiral electrode configurations, and having either $(C_4F)_n$ or carbon cathodes in either thionyl chloride- or sulfuryl chloride-based electrolytic solutions, a limited number of overpressurizations and explosions have occurred. Although some of the cells that exploded were fresh or only partially discharged, the majority of cells that exploded had done so after constant current over-discharge (i.e., they had been drained past 0 volts) and an attempt to recharge the "dead" cells had been made, the recharging current flow being in the opposite direction to the discharge current flow. The current flow in such a recharging attempt (analogous to operation of the "dead" cell in parallel with one or more fresh cells) causes dendritic lithium to grow on the lithium anode. When the electrodes are of similar dimensions, as they are in spiral electrode configuration cells, this anode growth has been found to be concentrated around the edges of the electrodes where it can easily grow across the space between the electrodes and short circuit the cell. The passage of current through such a short circuit can heat the lithium to its melting point (180° C) at which time it is believed to react exothermically with elemental sulfur generated during cell discharge. It has also been determined that such explosions can occur when cells of this type are discharged under conditions (eg. constant current of 100 mA/cm$^2$ of electrode area for 0.4 hours) which cause the temperature of the cell to reach the melting point of elemental sulfur (119° C). The sulfur formed in the discharge reaction, now molten, flows to the bottom of the cell and makes direct contact with the lithium anode material. Explosions can occur below the melting point (180° C) of lithium, but if the cell temperature is raised to about 180° C or above, where both the lithium and sulfur are molten, the cells will explode.

OBJECTS OF THE INVENTION

It is, therefore, the primary object of this invention to provide improved electrochemical cells which minimize the possibility of explosions due to formation of elemental sulfur during operation thereof.

These and still further objects, features and advantages of the present invention will become apparent upon consideration of the following detailed disclosure.

BRIEF SUMMARY OF THE INVENTION

These and still further objects and advantages of the present invention are achieved, in accordance therewith, by providing an electrochemical cell having an oxidizable active anode material, a cathode material, and electrolytic solution between and in contact with the anode and cathode, the electrolytic solution comprising an inorganic solvent, a solute dissolved therein, and an additive which is capable of dissolving any elemental sulfur generated during operation of the cell and which is unreactive with the other components of the cell.

This invention is particularly applicable to those cells which have a lithium anode, a carbon or $(C_4F)_n$ cathode, and an electrolytic solution which forms elemental sulfur when it is electrochemically reduced on the surface of the cathode material during discharge of the cell. Such electrolytic solvents include thionyl chloride, thionyl bromide, sulfuryl chloride, and mixtures thereof with other inorganic solvents, such as for example, phosphorus oxychloride. It is preferred that the solvent is dried (ie., made anhydrous) prior to use. Of these solvents, thionyl chloride is presently preferred.

The solvents specifically set forth above have been found to be electrochemically reduced upon the surface of the cathode electrode (e.g., carbon or $(C_4F)_n$). As a result thereof, cells utilizing such solvents have various advantageous properties, such as high energy densities, relatively flat discharge curves over a substantial portion of their useful lives, and/or the capacity to make use of the otherwise "dead" weight of the solvent as a source of electrical energy (in combination with the oxidizable active anode material).

The solvent has a suitable solute (described below) dissolved therein and, in addition, includes an additive, such as sulfur monochloride ($S_2Cl_2$), which is capable of dissolving any sulfur generated during operation of the cell, (eg., generated by electrochemical reduction of the solvent upon the surface of the cathode material). Sulfur monochloride is capable of dissolving large amounts of sulfur (up to 67% by weight at 25° C) and has been found, both in the pure state and in solution in thionyl chloride, to be unreactive with metallic lithium. The addition of sulfur monochloride to a 1.8M lithium tetrachloroaluminate thionyl chloride electrolytic solution has little effect on the energy capacity of cells described herein, and changes the shape of the constant current discharge curves only slightly. Additionally, and most importantly, examination of fully discharged cells (filled with an electrolytic solution containing 33% sulfur monochloride and 67% 1.8M lithium tetrachloroaluminate in thionyl chloride) has shown the cells to be completely free of sulfur deposits. The amount of the additive to be added to the cells should be in slight excess of the amount necessary to dissolve the total amount of elemental sulfur theoretically producible during operation of any given cell. While the absolute amount of additive will vary depending upon the size and design of a particular cell, generally about 25 to about 40%, by volume, of the total electrolytic solution will be sufficient to minimize the possibility of explosions due to formation of elemental sulfur during operation of the cells described herein.

The present invention is particularly of interest for use with those cell configurations where the electrodes are extremely close together, for example, in cells having spiral or "jelly-roll" electrode configurations (such as shown generally, for example, in U.S. Pat. No. 3,510,353). In general, however, this invention is applicable to all electrochemical cells which form elemental sulfur during discharge thereof and which contain a material highly reactive with such sulfur at a temperature which is reached or exceeded during operation of the cell.

The cathode material is preferably carbon, such as graphite, carbon black, or acetylene black, or an intercalation compound of carbon and fluorine represented by the general formula $(C_4F)_n$ where $n$ refers to the presence of a large, but indefinite, number of recurring $(C_4F)$ groups in the intercalation compound. The $(C_4F)_n$ cathode material can be utilized in combination with carbon (e.g., graphite or carbon black) or $(CF)_n$. When admixed with $(CF)_n$, the intercalation compound (i.e., the active cathode material) will have an average or representative formula $(C_xF)_n$ where $x$ is greater than 1 and less than 4. Such intercalation compounds are considered mixtures of $(C_4F)_n$ and $(CF)_n$ in proportions which give the particular value of $x$. The compounds having the formula $(C_4F)_n$ are presently preferred, however, over admixtures thereof with $(CF)_n$ since, in general, greater cathode utilization efficiencies can be attained therewith.

The anode is an oxidizable material, particularly lithium metal. Other oxidizable anode materials contemplated for use in the cells of this invention include the other alkali metals, such as sodium, potassium, etc. The anode may be constructed of the oxidizable material in contact with a suitable supporting metal grid. The grid for a lithium anode, for example, can be made of nickel, nickel alloys (such as Monel), stainless steel, silver, or platinum.

As used throughout this specification and claims, when an electrochemical cell is designated to have a particular anode or cathode, or to be made of a particular anode or cathode material, that anode or cathode, or anode or cathode material, shall mean the electrochemically active component of the anode or cathode structure or the electrode surface at which the electrochemical reaction takes place. The electrochemically active component may be in contact with, or form part of, a suitable substrate which further defines the total anode or cathode structure.

Solutes which can be dissolved in the solvent material provide at least one anion of the general formula $X^-$, $MX_4^-$, $M'X_6^-$, or $M''X_6^=$, where M is an element selected from the group consisting of boron and aluminum; M' is an element selected from the group consisting of phosphorus, arsenic, and antimony; M'' is an element selected from the group selected from the group consisting of tin, zirconium and titanium; and X is a halogen. Examples of suitable solutes yielding anions $MX_4^-$ are: tetrachloroaluminates $(AlCl_4^-)$, tetrabromoaluminates $(AlBr_4^-)$, tetrachloroborates $(BCl_4^-)$, and tetrafluoroborates $(BF_4^-)$. Examples of solutes yielding anions $M'X_6^-$ are: hexafluorophosphates $(PF_6^-)$, hexafluoroarsenates $(AsF_6^-)$, hexafluoroantimonates $(SbF_6^-)$ and hexachloroantimonates $(SbCl_6^-)$. Examples of solutes yielding anions $M''X_6^=$ are: hexachlorostannates $(SnCl_6^=)$, hexachlorozirconates $(ZrCl_6^=)$ and hexachlorotitanates $(TiCl_6^=)$. Solutes yielding a halogen anion, particularly chlorides $(Cl^-)$, bromides $(Br^-)$, and iodides $(I^-)$, and solutes providing one of the anions dichloroiodates $(ICl_2^-)$ dichlorophosphates $(PO_2Cl_2^-)$, perchlorates $(ClO_4^-)$ and chlorosulfates $(SO_3Cl^-)$ are also contemplated within the scope of this invention.

The solute also provides at least one cation. This cation may be an alkali metal, such as lithium, sodium, potassium, cesium, rubidium; an alkali earth metal, such as magnesium, calcium, strontium, and barium; or a lanthanide rare earth element such as lanthanum, terbium, neodymium, cerium, europium and samarium. (Cations have the following general formula $R_4N^+$ where R is a radical selected from the group consisting of methyl, ethyl, propyl, isopropyl, butyl and isobutyl are also contemplated to be suitable for use in this invention, provided the anode is protected from passivation by suitable means such as a salt bridge or an ionically conducting separator. Examples of such cations are: tetramethylammonium $(CH_3)_4N^+$, and tetrabutylammonium $(C_4H_9)_4N^+$. These cations may be added as the tetraalkylammonium chloride, for example.) Other cations contemplated within the scope of this invention are those resulting from solvent dissociation such as $SOCl^+$ in the case of a thionyl chloride-based electrolytic solution; $SO_2Cl^+$; etc.

Solutes having lithium cations and large anions which are stable to oxidation and reduction are particularly desirable. The preferred lithium solute compounds are: lithium tetrachloroaluminate, lithium tetrachloroborate, lithium tetrafluoroborate, lithium hexafluorophosphate, lithium hexafluoroarsenate, lithium hexachlorotitanate and lithium chlorosulfate, particularly lithium tetrachloroaluminate. Other preferred compounds are Lewis acids, particularly aluminum chloride $(AlCl_3)$, boron fluoride $(BF_3)$, tin chloride $(SnCl_4)$, antimony chloride $(SbCl_5)$ antimony fluoride $(SbF_5)$, titanium chloride $(TiCl_4)$, aluminum bromide $(AlBr_3)$, phosphorus fluoride $(PF_5)$, phosphorus chloride $(PCl_5)$, arsenic fluoride $(AsF_5)$, arsenic chloride $(AsCl_5)$, zinc chloride $(ZnCl_2)$ and zirconium chloride $(ZrCl_4)$, when used in combination with a Lewis base having the general formula $A_mB_n$, where A is an element selected from the group consisting of lithium, sodium, potassium, rubidium, cesium, magnesium, calcium, strontium, barium and the rare earths, and B is an element selected from fluorine, chlorine, bromine, iodine and oxygen. Included in this latter category are cesium chloride rubidium chloride, barium chloride, and preferably, lithium chloride.

The required anion and cation may be formed as a result of a chemical reaction directly with the solvent. For example, the Lewis acid $AlCl_3$ will react with the solvent $SOCl_2$ to yield the anion $AlCl_4^-$. The anion and cation may also be formed as a result of the reaction of a Lewis acid with a Lewis base dissolved in the solvent. For example, lithium chloride, LiCl, a Lewis base, will react with $AlCl_3$ to form $LiAlCl_4$ which dissociates in part to solvated $Li^+$ and $AlCl_4^-$.

The solute for a particular cell can be chosen to yield a combination of any of the anions and cations listed above, however, the electrolytic solution should contain at least $10^{-3}$ moles per liter of cation and at least $10^{-3}$ moles per liter of anion. Preferably, at least $10^{-1}$ moles per liter of cation and at least $10^{-1}$ moles per liter of anion are present. In addition, the solute should be soluble in the inorganic solvent in the presence of the amounts of additive utilized, that is, the solute should not precipitate out from the electrolytic solution when the additive is utilized as taught herein. The compatability of particular solvent, solute, and additive materials can be determined by routine experimentation.

A suitable separator can be employed to prevent the reaction of anode and cathode materials when no electric current flows through the external circuit. Since the cathode material is not spontaneously reactive with the anode material, mechanical separators which only prevent contact between the two electrodes can be used. A wide variety of ceramic and plastic materials having small pore sizes are available. Examples of such materials include: alumina, beryllia, magnesia, zirconia, titania, porcelain, porous glass, fritted glass, nonwoven porous polytetrafluoroethylene and other fluorinated polymers, polypropylene and polyethylene.

The electrolytic solution can also be in paste form as set forth in copending application Ser. No. 420,125, filed Nov. 29, 1973, now U.S. Pat. No. 3,891,457, the disclosure of which is incorporated herein by reference.

DESCRIPTION OF SPECIFIC EMBODIMENTS

The following Examples are given to enable those skilled in the art to more clearly understand and practice the present invention. They should not be considered as a limitation of the scope of the invention but merely as being illustrative and representative thereof.

EXAMPLE I

The cathode is prepared from 2.52 g. of 50% compressed carbon black (Shawinigan Products Co., Englewood Cliffs, N.J.) and a sufficient amount of polytetrafluoroethylene to bind the carbon black to a 12 cm. by 4 cm. expanded nickel screen. This cathode is surrounded on both sides with pieces of glass mat filter paper and by 4 cm. high strips of 0.010 inch thick lithium metal foil which are also pressed onto similar expanded nickel screens. The lithium electrode on the inside of the cathode is 12cm. long while the lithium electrode on the outside of the cathode is 18 cm. long. The lithium electrodes are connected together electrically and the entire electrode assembly rolled up (into a "jelly-roll" configuration) and fitted into a "C" size nickel can (2.6 cm. in diameter, 5.0 cm. high with a flanged top containing connections for the electrodes). The cell is then filled with 12 ml. of an electrolytic solution containing 1.8M $AlCl_3$ and 1.8M LiCl (equivalent to 1.8M $LiAlCl_4$), in thionyl chloride and 33.3% (by volume) $S_2Cl_2$. The cell is discharged at 120mA (1mA/cm²) for 24.4 hours (ie., until the voltage decreased to 3.0 volts) then charged at 1.2 amperes for 157 minutes. No explosion occurred. In contrast, cells prepared without $S_2Cl_2$ or with up to 20 vol.% $S_2Cl_2$ exploded within 35 minutes of the start of the recharging cycle. Dissassembly of the cell containing 33.3% $S_2Cl_2$ reveals no elemental sulfur deposits anywhere in the cell (the sulfur being dissolved in the $S_2Cl_2$). Dissassembly of cells which presumably would have exploded on recharging revealed the presence of solid yellow elemental sulfur on the cathode structure and on the glass mat separator (indicating that, for these cells, an insufficient amount of the additive had been utilized).

EXAMPLE 2

Example 1 is repeated substituting 25 vol. % $S_2Cl_2$ for the 33.3 vol.% $S_2Cl_2$. The cell is discharged at 120 mA for 20.35 hours then charged for 130 minutes at 1.2 amperes without explosion.

EXAMPLE 3

The cell of Example 1 is discharged at 1.2 amperes constant current (120 mA) until the polarity reverses. The cell did not explode after 2 hours of continued overdischarge at reverse polarity.

EXAMPLE 4

Examples 1–3 are repeated with cells containing $(C_4F)_n$ as the cathode material with similar results.

These Examples are intended to be illustrative and representative of the teachings of this invention, which, in view of this disclosure, can be extended by those skilled in this art to other electrochemical cell configurations and components.

While the present invention has been described with reference to specific embodiments thereof, it should be understood by those skilled in this art that various changes may be made and equivalents may be substituted without departing from the true spirit and scope of the invention. In addition, many modifications can be made to adapt a particular situation, material or composition of matter, or then-present objective to the spirit of this invention without departing from its essential teachings.

What is claimed is:

1. An electrochemical cell comprising an oxidizable active anode material; a cathode material; and an electrolytic solution between and in contact with said anode and said cathode, said electrolytic solution comprising an inorganic solvent material and a solute dissolved therein; said solvent material being electrochemically reduced upon the surface of said cathode material during discharge of said cell whereby elemental sulfur is formed as one of the reaction products; said electrolytic solution further including an additive in sufficient amount to dissolve all of said elemental sulfur which is formed during operation of said cell.

2. The electrochemical cell of claim 1 wherein said active anode material is lithium.

3. The electrochemical cell of claim 1 wherein said cathode material comprises carbon black or graphite.

4. The electrochemical cell of claim 1 wherein said cathode material comprises $(C_4F)_n$, wherein n refers to the presence of a large, but indefinite, number of recurring $(C_4F)$ groups in said cathode material.

5. The electrochemical cell of claim 1 wherein said active cathode material is a mixture of $(C_4F)_n$ and $(CF)_n$ to give a material represented by the general formula $(C_xF)_n$, where $x$ is greater than 1 and less than 4, and $n$ refers to the presence of a large, but indefinite, number of recurring $(C_xF)$ groups in said cathode material.

6. The electrochemical cell of claim 1 wherein said electrolytic solution includes a solvent material selected from the group consisting of thionyl chloride, thionyl bromide, sulfuryl chloride, mixtures thereof, and mixtures thereof with phosphorus oxychloride.

7. The electrochemical cell of claim 1 wherein said solvent material includes thionyl chloride.

8. The electrochemical cell of claim 1 wherein said solute provides at least one anion having the formula $X^-$, $MX_4^-$, $M'X_6^-$, or $M''Cl_6^=$, where M is an element selected from the group consisting of aluminum and boron; M' is an element selected from the group consisting of phosphorus, arsenic and antimony; M'' is an element selected from the group consisting of tin, zirconium and titanium; and X is a halogen; said solute further providing at least one cation selected from the group consisting of alkali metals, the alkaline earth metals, the lanthanides, $SOCl^+$, and $SO_2Cl^+$.

9. The electrochemical cell of claim 1 wherein said solute includes at least one compound selected from the group consisting of lithium tetrachloroaluminate, lithium tetrachloroborate, lithium tetrafluoroborate, lithium hexafluorophosphate, lithium hexafluoroarsenate, lithium hexafluoroantimonate, lithium hexachloroantimonate, lithium hexachlorostannate, lithium hexachlorozirconate, lithium hexachlorotitanate and lithium chlorosulfate.

10. The electrochemical cell of claim 1 wherein said active anode material, said cathode material, and at least one separator are bonded together to form a spiral electrode assembly.

11. An electrochemical cell comprising a lithium anode; a carbon cathode; an electrolytic solution between and in contact with said anode and said cathode, said electrolytic solution including a solvent material selected from the group consisting of thionyl chloride, sulfuryl chloride, mixtures thereof, and mixtures thereof with phosphorus oxychloride, and a solute dissolved therein; said solvent material being electrochemically reduced upon the surface of said cathode during discharge of said cell whereby elemental sulfur is formed as one of the reaction products of said discharge; said electrolytic solution further including an additive in sufficient amount to dissolve all of said elemental sulfur which is formed during operation of said cell.

12. The electrochemical cell of claim 11 wherein said active anode material, said cathode material, and at least one separator are bonded together to form a spiral electrode assembly.

13. The electrochemical cell of claim 13 wherein said carbon cathode material is present in said electrolytic solution which is in paste form, said cell further including an inert cathode current collector.

14. An electrochemical cell comprising a lithium anode; a $(C_4F)_n$ cathode, wherein $n$ refers to the presence of a large, but indefinite, number of recurring $(C_4F)$ groups in said cathode material; and an electrolytic solution between and in contact with said anode and said cathode, said electrolytic solution including a solvent material selected from the group consisting of thionyl chloride, sulfuryl chloride, mixtures thereof and mixtures thereof with phosphorus oxychloride, and a solute dissolved therein; said solvent material being electrochemically reduced upon the surface of said cathode during discharge of said cell whereby elemental sulfur is formed as one of the reaction products of said discharge; said electrolytic solution further including an additive in sufficient amount to dissolve all of said elemental sulfur which is formed during operation of said cell.

15. The electrochemical cell of claim 14 wherein said active anode material, said cathode material, and at least one separator are bonded together to form a spiral electrode assembly.

16. An electrochemical cell comprising an oxidizable active anode material; a cathode material; and an electrolytic solution between and in contact with said anode material and said cathode material, said electrolytic solution comprising an inorganic solvent material and a solute dissolved therein; said solvent material being electrochemically reduced upon the surface of said cathode material during discharge of said cell whereby elemental sulfur is formed as one of the reaction products; said electrolytic solution further including sulfur monochloride in sufficient amount to dissolve all of said elemental sulfur formed during operation of said cell.

17. The electrochemical cell of claim 16 wherein said inorganic solvent material includes a solvent material selected from the group consisting of thionyl chloride, thionyl bromide, sulfuryl chloride, mixtures thereof, and mixtures thereof with phosphorus oxychloride.

18. The electrochemical cell of claim 16 wherein said anode material is lithium, said cathode material is carbon, and said solvent includes thionyl chloride, sulfuryl chloride, mixtures thereof, and mixtures thereof with phosphorus oxychloride.

19. The electrochemical cell of claim 18 wherein said solvent includes thionyl chloride.

20. The electrochemical cell of claim 16 wherein said anode material is lithium, said cathode material is $(C_4F)_n$ where n refers to the presence of a large, but indefinite, number of recurring $(C_4F)$ groups in said cathode material, and said solvent includes thionyl chloride, sulfuryl chloride, mixtures thereof, and mixtures thereof with phosphorus oxychloride.

21. The electrochemical cell of claim 20 wherein said solvent includes thionyl chloride.

22. The electrochemical cell of claim 16 wherein said anode material is lithium.

23. The electrochemical cell of claim 16 wherein said cathode material comprises carbon black or graphite.

24. The electrochemical cell of claim 16 wherein said cathode material includes $(C_4F)_n$ where $n$ refers to the presence of a large, but indefinite, number of recurring $(C_4F)$ groups in said cathode material.

* * * * *